United States Patent [19]
Ansley et al.

[11] Patent Number: 5,715,094
[45] Date of Patent: Feb. 3, 1998

[54] LENSLESS HELMET/HEAD MOUNTED DISPLAY

[75] Inventors: David A. Ansley, Sterling, Va.; Chungte W. Chen, Irvine; Ronald G. Hegg, Vista, both of Calif.

[73] Assignee: Hughes Electronics, Los Angeles, Calif.

[21] Appl. No.: 758,324

[22] Filed: Dec. 3, 1996

[51] Int. Cl.$^6$ .................................. G02B 27/14
[52] U.S. Cl. ............................................ 359/631
[58] Field of Search ...................... 359/630, 631, 359/632, 633

[56] References Cited

U.S. PATENT DOCUMENTS

| | | | |
|---|---|---|---|
| 4,026,641 | 5/1977 | Bosserman et al. | 359/869 |
| 5,299,063 | 3/1994 | Fritz et al. | 359/631 |
| 5,303,085 | 4/1994 | Rallison | 359/631 |

OTHER PUBLICATIONS

"Parameters in FED Product Design," F. Courreges, SID '96 Digest, pp. 45–48.

*Primary Examiner*—David C. Nelms
*Assistant Examiner*—Thomas Robbins
*Attorney, Agent, or Firm*—Michael W. Sales; Wanda K. Denson-Low

[57] ABSTRACT

A helmet/head mounted display including a display image source and a reflective visor for each eye. The image source includes a fiber optic cover plate with a planar input surface and a curved output surface which has curvature providing the correct curvature. The image source further includes a self-emitting device such as a field electrode display or electroluminescent device, or a polymer dispersed liquid crystal (PDLC) sandwiched between a thin, sharply tapered fiber optic plate and the fiber optic cover plate. For the PDLC image source, back light illumination is introduced through the tapered fiber optic plate, passes through or is scattered by the PDLC and then through the fiber optic face plate to the visor, for reflection to the observer's eye. The fiber optic face plate is constructed with a very low numerical aperture. The fibers of the cover plate are oriented toward the eye as seen in the reflection from the visor to reduce undesirable reflected light. No lenses or beam splitters are in the light path between the image source and the visor.

7 Claims, 4 Drawing Sheets

OUTPUT SURFACE
INPUT SURFACE

PDLC LAYER BETWEEN FO LIGHT GUIDE & FO CULVED FACEPLATE

LENSLESS HELMET/HEAD MOUNTED DISPLAY

TECHNICAL FIELD OF THE INVENTION

This invention relates to helmet/head mounted displays, and particularly to a display which requires no lenses or beam splitters between the image source and the visor.

BACKGROUND OF THE INVENTION

Helmet/head mounted displays are well known in the art. Such displays project an image, from an image generator such as a CRT or LCD display, to the eyes of the observer, and can combine the projected image with a view of the visible surroundings. Since the displays employ elements supported by or on the user's head, reduction of the weight of such elements is desirable in order to enhance the user's comfort when using the display. A further desirable objective is the improvement in the image quality provided by the helmet/head mounted displays. It can be difficult to simultaneously obtain both objectives, i.e. minimization of weight and improvement in image quality, as weight reduction can limit the design options available to the display designer.

U.S. Pat. No. 5,303,085 describes an optically corrected helmet mounted display. The display includes a beam splitter (dichromated gelatine layer 36 on fold mirror 24) which limits the vertical field of view and reduces the see-through transmission. Additionally, the operational spectral bandwidth is relatively narrow due to the highly wavelength dependent diffraction efficiency associated with a volume hologram.

SUMMARY OF THE INVENTION

A lensless helmet/head mounted display is described, and includes an image source for generating image light, the image source including a fiber optic cover plate disposed at an output side thereof of the source. The cover plate includes a curved output side, wherein image light generated by the image source is transmitted through fibers of the fiber optic cover plate, the light passed through the face plate forming the image light. The display further includes a curved reflective visor for collimating image light and redirecting the image light toward the eye of an observer. No lenses or beam splitters are disposed in the light path between the observer's eye and the image source.

In accordance with one aspect of the invention, the image source comprises a self-emissive image generator device, such as a field emission display or electroluminescent display. In accordance with another aspect of the invention, the image source comprises an electrically activated light scattering element such as polymer dispersed liquid crystal (PDLC). The light scattering element has the property that, in a first operating mode incident light is passed through the element without scattering, and in a second mode incident light is scattered. The image source further includes a thin tapered fiber optic plate having a taper surface along which a first side of the light scattering element is disposed. The tapered fiber optic plate includes a first surface into which first ends of optical fibers comprising the plate open, and a second surface at which second ends of the optical fibers open. The tapered fiber optic plate directs back light illumination incident on the first surface onto the light scattering element. The fiber optic cover plate is disposed along a second side of the light scattering element, so that the tapered fiber optic plate and the fiber optic face plate sandwich therebetween the light scattering element. Background light is introduced into and is modulated by the light scattering element, such that scattered light from the scattering element is scattered at angles which allow the light to be transmitted through fibers of the fiber optic face plate, and non-scattered light is passed through the scattering element at angles such that the light is substantially absorbed in the fiber optic face plate.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
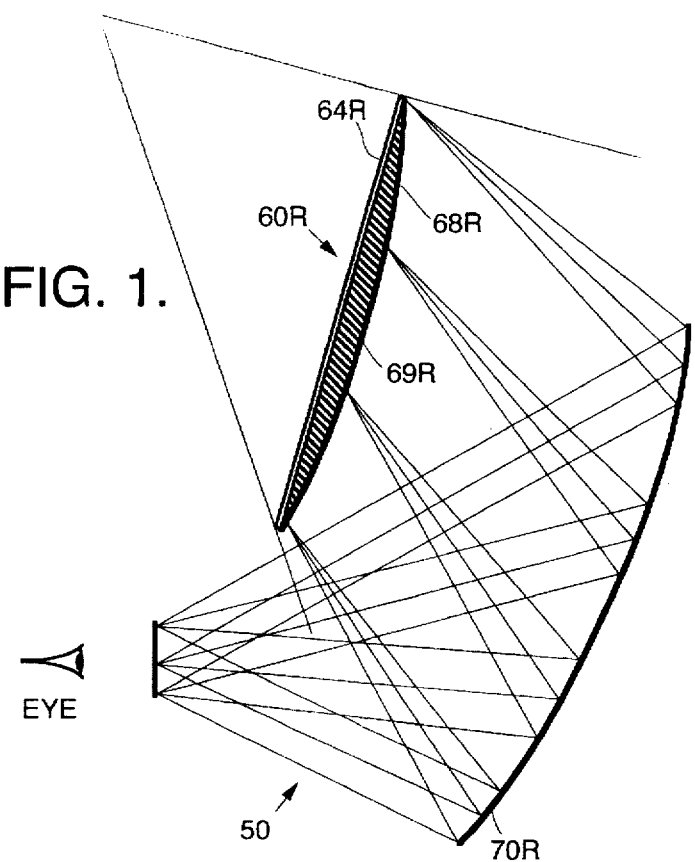
FIG. 1 is a side view of a display system embodying the invention.

A portion of a display system 50 embodying the invention is shown in side view in FIG. 1, illustrating the elements of the display for the observer's right eye. The system includes an image source 60R which in this exemplary embodiment includes a self-emissive display 64R such as a field emission display (FED). FEDs are known in the art, and are described, e.g. in "Parameters in FED Product Design," by F. Courreges, SID 96 Digest, pages 45–48. Alternatively, the FED can be replaced by another self-emissive image source, such as an electroluminescent display. As shown in FIG. 1, the image source 60R is located above the observer's right eye in this exemplary embodiment. The image source 60R includes a fiber optic cover plate 68R whose shape gives the correct image curvature. The system also includes a visor 70R which collimates the light from the fiber optic cover plate and redirects it towards the observer's eye. Depending on the application, the visor can be opaque, wherein the wearer does not view the ambient environment, or see-through to combine images generated by the display with a direct view of the ambient environment.

The FED 64R is a flat planar device. The purpose of the fiber optic cover plate 68R is to transform the flat plane image generated by the FED into an image on the proper curved output surface on the output side 69R of the cover plate. The curvature of the output side 69R of the fiber optic cover plate 68R is such that every point on the output side is a correct distance from the visor 70R. In order for light to be collimated by a spherical mirror, the image surface should be located at a distance which is ½ the radius of curvature of the visor. For example, if the radius of curvature of the visor is 100 mm, then the image surface should be 50 mm from the visor. In this embodiment, the image surface (side 69R) is also curved and its radius is ½ that of the visor radius. The complicating factor for off-axis displays is that the visor is not quite spherical because of the need to correct for optical aberrations such as astigmatism and coma. The visor becomes a toroid (different radius of curvature in horizontal and vertical planes) or a general aspherical surface. In this case, the area on the visor where the rays of light from the output side 69R of the fiber optic cover plate reflect from the visor is examined. The mean radius (R) of curvature for this area on the visor is calculated. The point on the output side of the fiber optic face plate where the rays of light are emitted should be R/2 from the visor. This is an interactive operation performed by computer during a design optimization phase of design of the display for a particular application. The curved output surface of the fiber optic cover plate can be shaped in the form of a generalized curved surface to maximize system performance and obtain wider field of view. Alternatively, the output surface of the cover plate can be a spherical shape to minimize the cost of fabrication.

Figure 2:
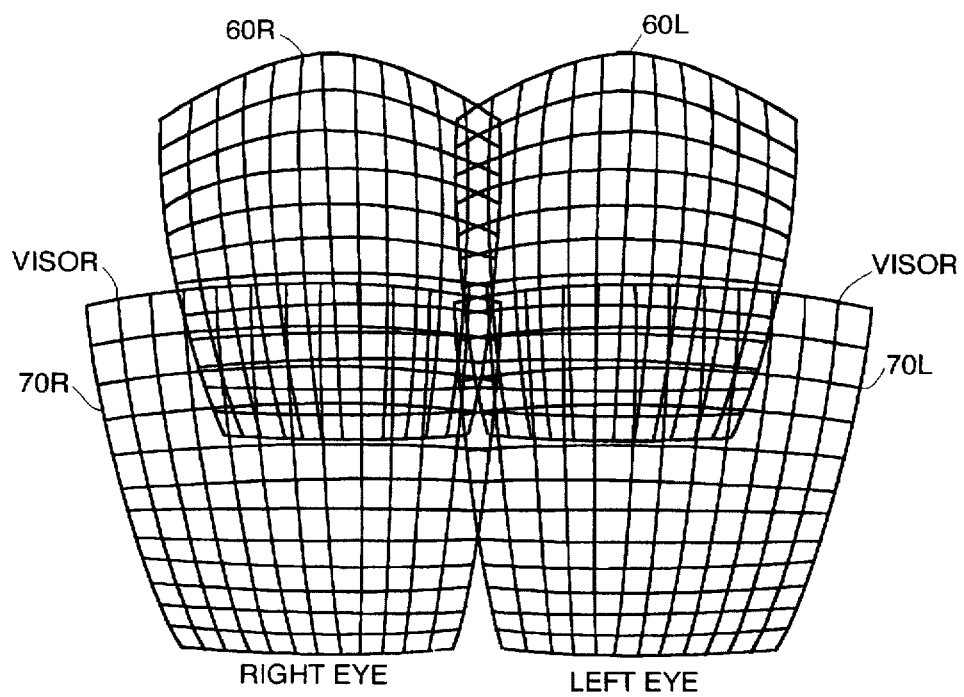
FIG. 2 is a back plan view of the system of FIG. 1.

The system 50 includes separate image sources and visors for each eye. FIG. 2 is a front view of the system showing the field emission displays 60R, 60L and the visors 70R and 70L. The field emission displays 60R, 60L can be located close to the observer's forehead, and in an exemplary embodiment are approximately 3 inches by 3 inches in size.

Figure 3:
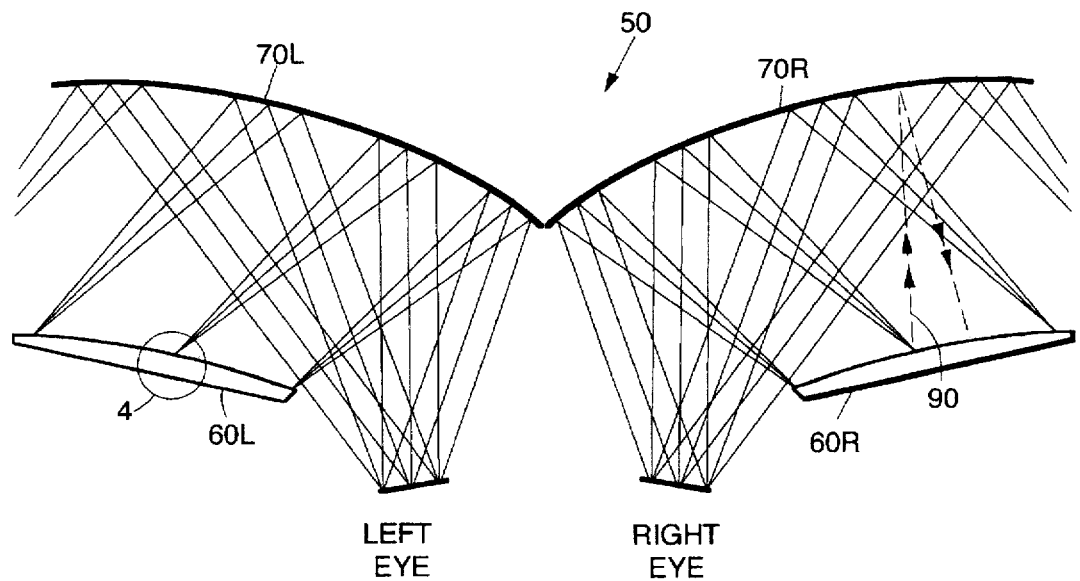
FIG. 3 is a top view of the system of FIG. 1, showing the problem of reflected light.
Figure 4:
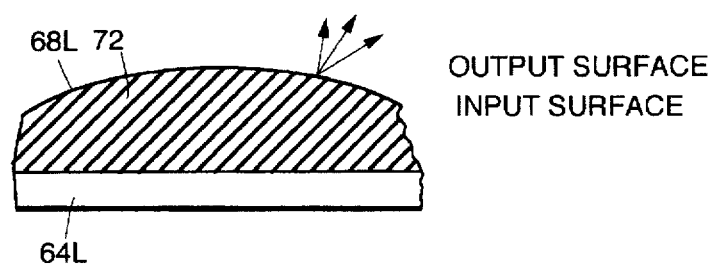
FIG. 4 is a enlarged view of the area marked as area 4 in FIG. 3, illustrating light rays directed into a fiber comprising the fiber optic cover plate.

FIG. 3 is a top view showing the system 50, with light ray 90 illustrating a potential reflected light problem, with light emitted from the field emission display 60R impinging on the surface of the visor 70R and being reflected back to the display 60R instead of being collimated toward the observer's eye. If light is allowed to leave the fiber optic cover plates 68L, 68R in indiscriminate directions, as shown by exemplary ray 90, it is possible for the light to reflect back onto the fiber optic cover plate. This is undesirable because it reduces image contrast. By orienting the direction of the fibers 72 (FIG. 4) in the fiber optic cover plate toward the eye (i.e. toward the visor-reflected image of the eye), it is possible to reduce or eliminate the reflected light problem.

Figure 5:
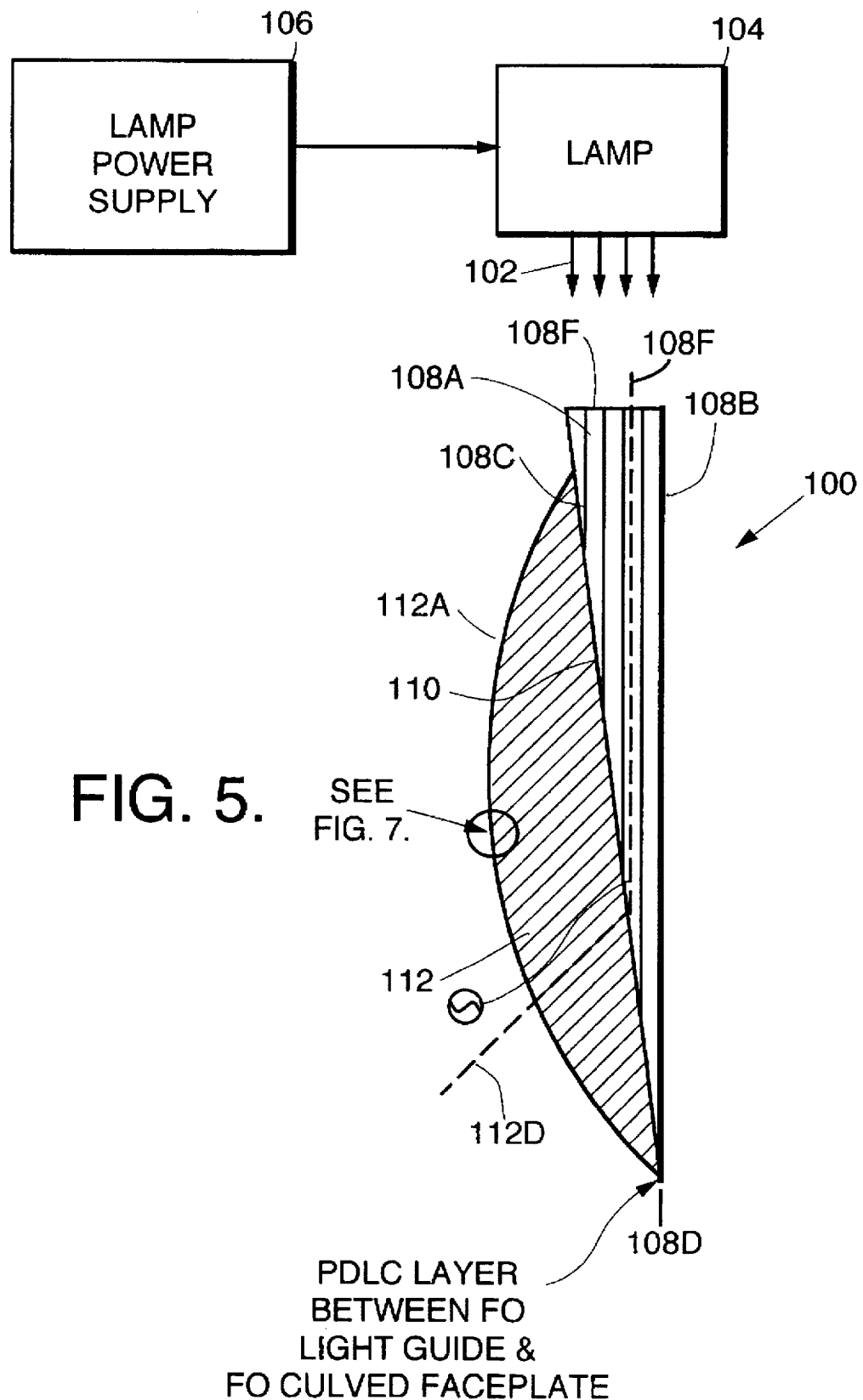
FIG. 5 illustrates an alternate embodiment of an image source useful in the display system of FIG. 1.
Figure 6:
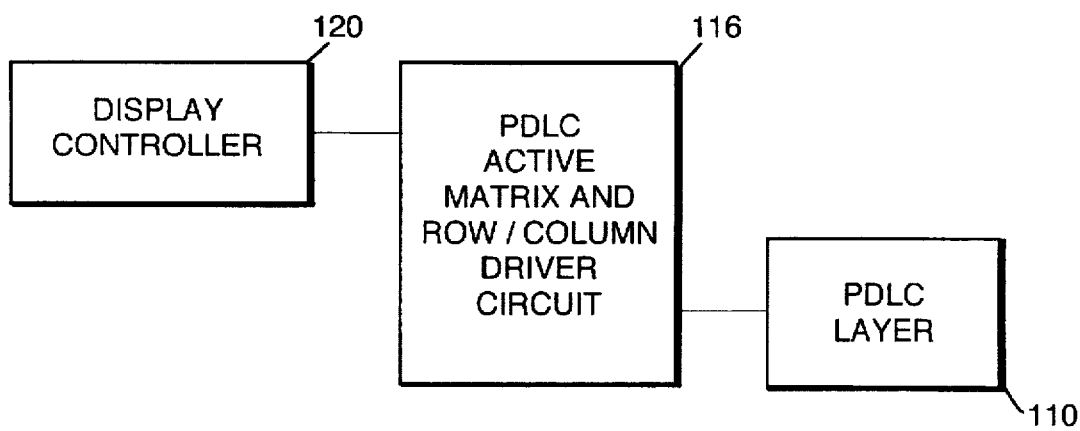
FIG. 6 is schematic block diagram showing the driver circuitry and controller for the image source of FIG. 5.

FIG. 5 is a side view of an alternate embodiment of an image source 100 which can be used in place of the FED image sources 60R and/or 60L. The image source 100 is a polymer dispersed liquid crystal (PDLC) image source. Back light indicated generally by light rays 102 is produced by a background light source 104 powered by a power supply 106, and introduced by means of a thin, sharply tapered fiber optic plate 108. Preferably, the source of background light emits highly collimated light, e.g. with a collimation of 100 milliradians or better. This can be achieved by a lamp and lens combination, for example. The tapered plate 108 includes a plurality of fibers 108A which are aligned with surface 108B. Surface 108C cuts through the fibers 108B to form an angle at apex 108D with surface 108B. An exemplary taper angle is ten degrees. For a three inch high fiber optic cover plate, the thickness of the tapered plate 108 along surface 108E is approximately 0.5 inches.

A PDLC layer 110 is sandwiched between the tapered plate 108 and a fiber optic cover plate 112 with an output surface 112A which has the proper curvature. The PDLC layer 110 is activated by means of an active matrix such as used for twisted nematic liquid crystals, except that the voltage levels are much higher, typically 60–90 volts. FIG. 5 is a schematic block diagram showing a display controller 120 and a PDLC active matrix and row/column driver circuit 116 suitable for driving the PDLC layer 110 in order to produce the required spatial modulation for producing a desired image.

There are two types of PDLC. One type is transparent when the voltage is zero. As the voltage is increased, the PDLC scatters more and more light. The other type scatters light when the voltage is zero; as the voltage is increased, the PDLC scatters less and less light. Either type of PDLC can be employed in a display system embodying the invention. The fiber optic cover plate 112 has a very low numerical aperture (n.a.), with the fibers oriented toward the observer's eye as reflected by the visor, in order to reduce unwanted reflected light from the visor. An exemplary n.a. value or range of values for the fiber optic face plate is between 0.01 and 0.05. The axis 108F of each fiber 108A of the tapered plate 108 and the axis 112D of the fibers 112C of the cover plate 112 are oriented at an obtuse angle Θ (FIG. 5). When the PDLC material is transparent in the non-scattering mode, substantially all the light enters the fibers 112C of the fiber optic cover plate at an angle of propagation which exceed the n.a. of the fiber, and is absorbed in the cladding 112C of the fibers. When the PDLC material is in the scattering mode, some of the scattered light enters the fibers of the cover plate at angles of propagation within the n.a. of the fiber optic cover plate 112 and passes through the fiber optic cover plate 112 toward the visor.

Figure 7:
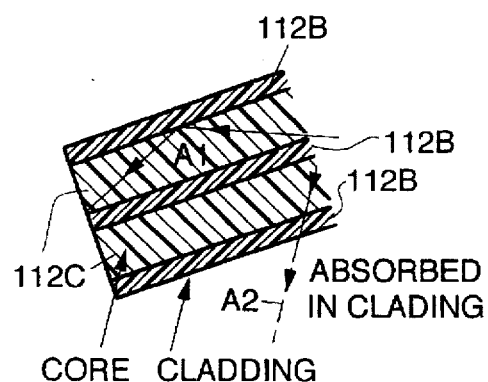
FIG. 7 is a enlarged view of the area marked as area 7 in FIG. 5, illustrating light rays directed into a fiber comprising the fiber optic cover plate.

As shown in FIG. 7, the fiber optic cover plate 112 employs fiber cladding 112B which is made of highly absorbing glass. A typical fiber core diameter dimension is 6 microns, with a cladding thickness of 2 microns. Thus, in this example, the center-to-center spacing of the fibers is 8 microns. The maximum angle of propagation obeys Snell's law, (N1)(sin(A1))=(N2)(sin(A2)), where N1 is the index of refraction in the fiber core, A1 is the angle of propagation in the fiber core, N2 is the index of refraction in the cladding, and A2 is the angle of propagation in the cladding. In order for the light to propagate along the fiber, the following condition must be met: A1≧arc sin (N2/N1) when sin(A2) =1. For example, when N1=1.65, N2=1.64, A1 is greater than 83.69 degrees with respect to the normal to the fiber wall, or 90−83.69=6.31 degrees with respect to the longitudinal axis of the fiber. In this example, if the angle of the light propagating along the fiber is more than 6.31 degrees with respect to the longitudinal axis of the fiber, the light will not be reflected at the boundary wall between the core and the cladding, but instead will pass into the cladding and be absorbed by the black absorbing material in the cladding. Experiments have shown that a 100:1 black/white contrast ratio can be achieved.

The orientation of the fibers in the fiber optic plate 112 may require a Snell's law correction factor if the output face of each fiber is not perpendicular to the axis of the fiber. Such a correction is known to those skilled in the art.

Figure 8A:
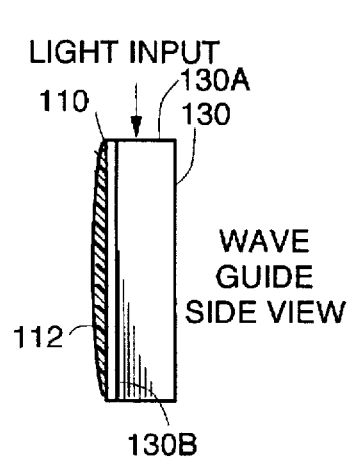
FIG. 8A is a side view illustrating an alternate embodiment to the tapered plate comprising the image source of FIG. 5.
Figure 8B:
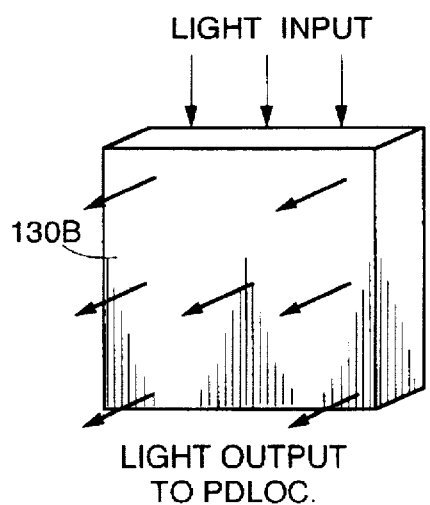
FIG. 8B is an isometric view of the optical waveguide comprising the alternate embodiment of FIG. 8A.

The tapered fiber optic plate 108 can alternatively be replaced with an optical waveguide 130, as illustrated in FIGS. 8A and 8B. The input light, preferably uncollimated for this embodiment, enters the waveguide through surface 130A, and through internal reflections within the waveguide, a portion of the light is output through surface 130B perpendicularly to the PDLC layer 110 and the fiber optic cover plate 112. FIG. 8A is a side view illustrating the optical waveguide, PDLC layer and fiber optic cover plate combination. FIG. 8B is an isometric view of the optical waveguide.

Figure 9:
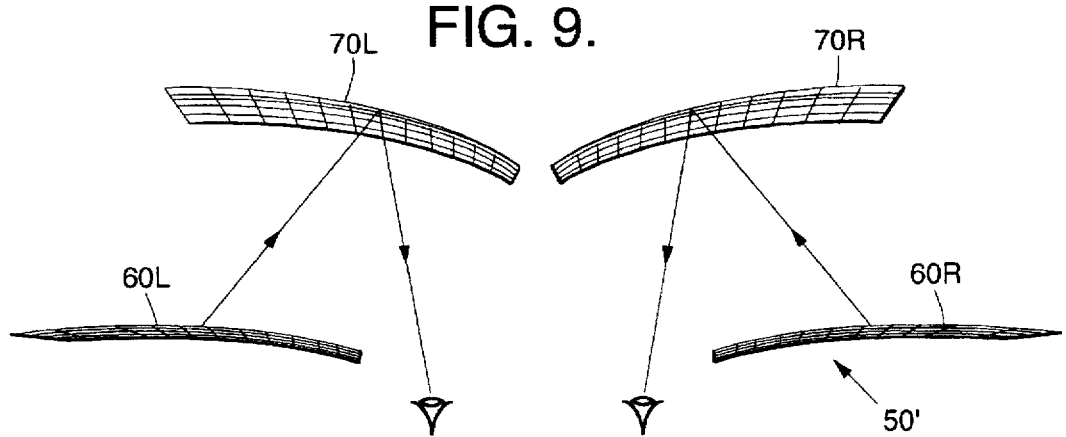
FIG. 9 is a plan view of an alternate embodiment of the display system according to the invention, wherein the image sources are outboard of the wearer's eye.

FIG. 9 is a top plan view illustrating an alternate embodiment of a display system 50' embodying the invention. The difference between this alternate embodiment and the display system 50 of FIGS. 1-4 is that the image sources are located outboard of the observer's eyes.

The display system in accordance with the invention has the advantage that the helmet/head mounted display is lighter because no lenses or beam splitters are required between the image source and the visor.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A helmet/head mounted display, comprising:
    a reflective visor for redirecting image light toward the eye of the observer; and
    an image source for generating said image light, the image source comprising:
        a source of background light;
        an electrically activated light scattering element, said element when in a first operating mode for scattering light incident thereon from the light source, said element when in a second operating mode for passing light therethrough without scattering;
        optical apparatus for introducing said background light into said light scattering element; and
        a fiber optic face plate disposed along an output side of the light scattering element, wherein the background light is introduced into and is modulated by the light scattering element, the light passed through the light scattering element and the face plate forming said image light.

2. The display of claim 1 wherein said optical apparatus comprises a thin tapered fiber optic plate having a taper surface along which said a first side of said light scattering element is disposed, the tapered fiber optic plate including a first surface into which first ends of optical fibers comprising the plate open, and wherein second ends of the optical fibers open at said taper surface, said tapered fiber optic plate for directing back light incident on said first surface onto said light scattering element, and wherein said tapered fiber optic plate and said fiber optic face plate sandwich therebetween said light scattering element.

3. The display of claim 2 wherein axes of optical fibers comprising said tapered plate are oriented at an obtuse angle with respect to axes of optical fibers comprising said cover plate, such that when said light scattering element is in a non-scattering mode, background light enters the fibers of the cover plate at an angle exceeding the numerical aperture of the fibers and is substantially absorbed in cladding surrounding the fibers of the cover plate, and when the light scattering element is operated in a scattering mode, a substantial amount of scattered light passed through the scattering element enters the fibers of the cover plate at a propagation angle within the numerical aperture of the fibers and is transmitted through fibers of said fiber optic face plate.

4. The display of claim 1 wherein said fiber optic face plate is fabricated of optical fibers having a low numerical aperture.

5. The display of claim 1 wherein said light scattering element comprises a polymer dispersed liquid crystal (PDLC).

6. The display of claim 1 wherein the fiber optic face plate includes a flat first surface disposed adjacent the light scattering element and a curved output surface from which said image light is emitted.

7. The display of claim 1 wherein said optical apparatus comprises an optical waveguide.

* * * * *